United States Patent [19]

Morrison

[11] Patent Number: 5,382,285
[45] Date of Patent: Jan. 17, 1995

[54] BIOFOAM

[75] Inventor: Robert L. Morrison, Modesto, Calif.

[73] Assignee: Regents of the University of California, Oakland, Calif.

[21] Appl. No.: 43,300

[22] Filed: Apr. 6, 1993

[51] Int. Cl.⁶ ............... C09D 105/00; C08J 9/00; C08L 89/00; C08L 93/00

[52] U.S. Cl. .................. 106/122; 106/124; 106/125; 106/126; 106/129; 106/133; 106/205; 106/207; 106/218

[58] Field of Search .......... 106/122, 124, 125, 126, 106/129, 133, 205, 207, 218

[56] References Cited

FOREIGN PATENT DOCUMENTS

| | | | |
|---|---|---|---|
| 303259 | 2/1989 | European Pat. Off. | 106/122 |
| 1811290 | 6/1970 | Germany | 106/122 |
| 2734503 | 2/1979 | Germany | 106/122 |
| 1005569 | 9/1965 | United Kingdom | 106/122 |

OTHER PUBLICATIONS

"The Light Stuff" by Andrew Chaikin, *Popular Science*, p. 72, Feb. 1993.

"The Versatile Biofoam Solid" by Robert L. Morrison, *The World & I*, p. 244, Nov., 1992.

"SEAgel the latest in lightweight insulators" by Gordon Yano, *Newsline*, published by UC-LLNL, Jun. 5, 1992.

The Woodworkers' Store Catalog 1992–93, cover page, and p. 1 with packing peanut material listed. No month.

"Lighter–than–Air Material Derived from Kelp", *Inside R&D*, vol. 21, No. 35, p. 8, Aug. 26, 1992.

"Lightweight, Biodegradable SEAgel has rich Commercial Potential", *Industrial Bioprocessing Technology*, vol. 14, No. 10, p. 5, Oct. 1992.

*Primary Examiner*—Anthony Green
*Attorney, Agent, or Firm*—Henry P. Sartorio; L. E. Carnahan

[57] ABSTRACT

Biofoam is a rigid, opaque microcellular organic foam made from organic materials derived from natural products and biological organisms. Typical organic materials are agar, agarose, gelatin, algin, alginates, gellan gum, and microcrystalline cellulose. The organic material is dissolved in a polar solvent, typically water, and the solution can be gelled immediately. The gel is frozen and freeze-dried to form the biofoam. Alternatively, a nonpolar solvent is added to the solution and emulsified. The resulting emulsion is then gelled, frozen, and freeze-dried. A variety of crystalline, fibrous, or metallic additives may be added to produce lightweight composite materials with enhanced strength and insulating properties. The amount of dilution of the organic material in the solvent(s) determines the density of the resulting biofoams, which ranges from about 1.0 mg/cm³ to about 500 mg/cm³.

20 Claims, 3 Drawing Sheets

BIOFOAM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to rigid, microcellular organic foams. The foam is made from naturally occurring biological or organic material and is formed by gelling a solution or, more commonly, an emulsion. The gel is frozen and freeze-dried to form a microcellular foam. The foam can be produced with any desired density from about 1 $mg/cm^3$ to about 500 $mg/cm^3$.

2. Description of Related Art

A myriad of applications exist for strong, low-density, inexpensive materials to manufacture lightweight articles. Synthetic polymers and foams, such as polystyrene, polyurethane, and Styrofoam ®, are commonly-used materials for these purposes. A soluble, lightweight material made from corn and wheat is also currently available. A continual demand exists for the development of ever lighter, stronger, cost-effective materials that are biodegradable and made from renewable resources.

The scientific research communities in government and academia would also like to produce very lightweight microcellular foams exhibiting a variety of characteristics. Researchers working with materials such as TPX (synthetic methylpentene polymer) and polystyrene have been unable to reach the very low densities and create the cell structures desired. The present invention addresses these diverse needs and is a biofoam produced from organic materials derived from biological organisms, such as algae.

Biofoam should not be confused with a different class of ultra-low density materials, namely aerogels, that were developed by another group at Lawrence Livermore National Laboratory. Aerogel is a true gel in which the gel structure must be maintained throughout the production process. In contrast, while the biofoam production process involves a gel stage, the end product is not a gel, but rather is an open-cell rigid foam material much like polystyrene. The different microscopic structures of the two materials leads to variances in their physical and chemical properties.

For example, the most common aerogel is a silica-based material that will not burn easily. Biofoam is an organic-based material that will burn without producing toxic fumes. The average cell or pore size of aerogel is about 100 times smaller than that of biofoam; aerogel pore diameters are about 0.02–0.03 microns, whereas biofoam cells have diameters of about 2–3 microns. The smaller pore size of aerogels makes them visibly transparent and better thermal and acoustic insulators than the visibly opaque biofoam. The major advantage of biofoam over aerogel is its lower production cost. Aerogel's complex production process involving supercritical extraction of solvents is time-consuming and expensive as compared to the freeze-drying procedure used in biofoam production. Furthermore, biofoam is a more robust material than aerogel that can withstand greater forces without fracturing or deforming. Biofoam can therefore be readily machined into different shapes.

SUMMARY OF THE INVENTION

The present invention is a foam material and a method for making the foam. Numerous variations in the starting materials and the process are possible. The biofoam material is produced by dissolving a biologically derived organic material, such as agar, gelatin, or an alginate, in a polar solvent, which is typically water. The amount of natural organic material in the solution determines the density of the final foam. The solution may be gelled directly or may undergo an emulsification process, where the solution is emulsified with a nonpolar solvent such as p-xylene, the volume of which varies widely depending on the density of the final foam. The gel resulting from the emulsion or the solution is frozen and then freeze-dried to produce the final biofoam.

The biofoam material is biodegradable, visibly opaque, mechanically strong, thermally insulative, and has any pre-selected density, including densities less than air (1.2 $mg/cm^3$). The lighter-than-air versions are a scientific curiosity at present because of the foam's extreme fragility. The foams typically have a density between 1 $mg/cm^3$ and 300 $mg/cm^3$. However, the more practical density range is about 6–100 $mg/cm^3$, and a foam of 6 $mg/cm^3$ can be machined if handled carefully. Machining is routine for the material at densities of 10–15 $mg/cm^3$ and greater. As the density increases, the foam becomes stronger and can support hundreds and thousands of times its own weight.

Early applications of biofoam may be as a replacement for the ubiquitous urethane foam packing peanuts, since these plastic forms are produced using environmental pollutants such as CFCs. Biofoam has a very low thermal conductivity, which makes the material a promising candidate for thermal insulation. One of the least expensive ways to produce biofoam is in thin, flat sheets, which is ideal for insulation in refrigerators and walls. The optimum density of biofoam for insulation is about 30 $mg/cm^3$, based on an average pore size of two to three microns. Biofoam also makes a good sound-deadening material and vibration dampener by propagating sound waves very slowly, and therefore biofoam could be used for both acoustic and thermal insulation.

The simplest molecular formula for an agar biofoam is $CH_2O$, which is also the repeating unit in cellulose and wood. Consequently, when biofoam burns, the combustion products are carbon dioxide and water. Like wood, biofoam will produce carbon monoxide if burned in an oxygen-poor atmosphere, but will produce none of the more toxic fumes emitted when burning common plastic or synthetic foams. Biofoam is completely biodegradable and can degrade even faster than wood. This new material may be a less expensive, low-density substitute for balsa wood, and would be used in the construction of model airplanes, as insulation in supertankers, or to provide sound insulation in high-speed rail cars and boats. The naturally renewable source of the starting materials and the absence of CFCs in the production process enhance the material's environmentally friendly qualities.

A variety of composite biofoam materials can also be made that are lightweight but extremely strong. Metals, metal-containing compounds, and fibrous additives can be incorporated into the structure to improve the material's strength and insulating properties. More specialized pharmaceutical, agricultural, and space applications of biofoam are possible: ingestible foam pellets containing doses of time-release medications, biodegradable biofoam capsules embedded with seeds and containing ingredients like fertilizer, pH buffer, or herbicide, and foam capture medium for micrometeorites or interplanetary dust particles.

DETAILED DESCRIPTION OF THE INVENTION

The invention is a rigid, microcellular organic foam and a process for making the foam. The material is opaque and can be produced having any density—from lighter than air (1.2 mg/cm$^3$) up to 500 mg/cm$^3$. Densities typically range from 1 mg/cm$^3$ to 300 mg/cm$^3$. The biofoam is created from naturally occurring organic material of plants and animals. This biologically derived material comes in many forms, and more than one form may be combined to reduce costs but retain the unique properties of the biofoam.

The microcellular organic foam is made from materials derived from natural products or previously living organic tissues. The starting materials are naturally occurring polymers or biopolymers (of biological origin) and not synthetic polymers or plastics. The three main examples of natural polymers are polysaccharides, proteins, and nucleic acids. Polysaccharides are macromolecules that make up a large part of the bulk of the vegetable kingdom. Cellulose and starch are the most abundant organic compounds in plants. The repeat unit in polymer chains of cellulose and starch is D-glucose. Proteins, the second group of natural polymers, are polyamides in which $\alpha$-amino acids make up the repeat units. Collagen is the protein of connective tissues and skin. When boiled in water, the collagen dissolves and forms gelatin. Keratin is the protein of hair and wool. Nucleic acids make up the final group of natural polymers, which include RNA and DNA and are polymers of substituted polyesters.

The biofoam material is usually made from polysaccharides and high molecular weight proteins (e.g., gelatin). Polysaccharides include gums, gum resins, resins, agar (red algae), agarose, algin (brown algae or kelp), alginates, or cellulose. Gums are complex carbohydrates derived from plants and swell to produce a viscous dispersion or solution when added to water. One specific example is gellan gum, which is used alone, preferably, to form a very low density biofoam, but which can also be used in combination with gelatin and agar. Typically, the starting organic material is a 50–50 mixture (by weight) of agar and another material, like gelatin or alginates. The cost of the final foam may be lowered by using a minimum of agar (or another more expensive material) with a less expensive material such as gelatin. The cost of the biofoam then becomes competitive with balsa wood and conventional insulating materials.

Figure 1:
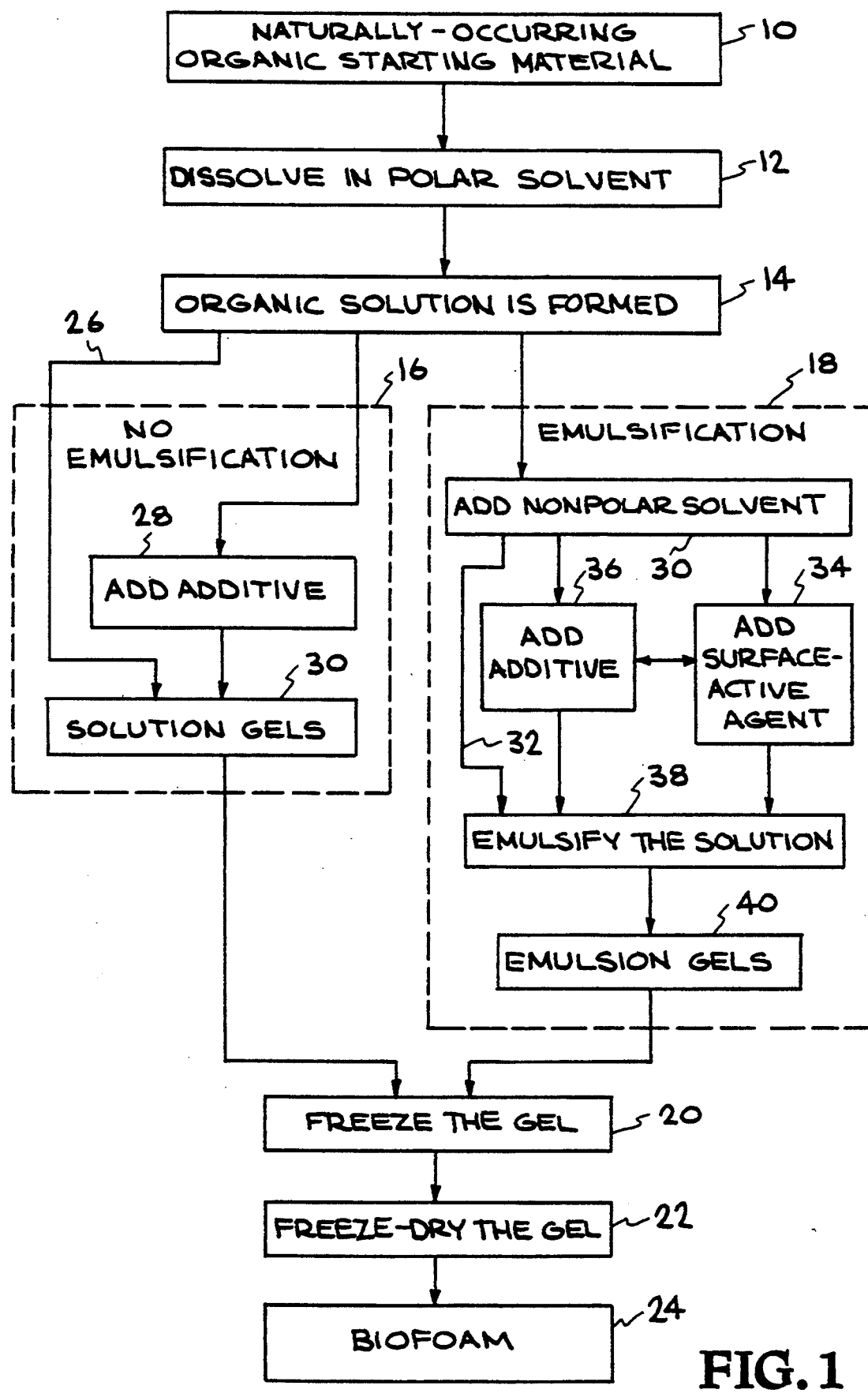
FIG. 1 is a flowchart of the method for making biofoams.

FIG. 1 is a flowchart illustrating the method of making biofoams. A natural organic material 10 is initially dissolved in a polar solvent 12, which is preferably water, but may also be a ketone, an ether, or an alcohol. The bio-organic material forms a solution 14 in water, and the organic solution 14 is either gelled directly 16 without emulsification or undergoes an emulsification process 18, where the resulting emulsion is gelled. The gel formed by either procedure 16,18 is frozen 20 and freeze-dried 22 to form a final biofoam 24. The density of the final foam 24 is determined by the amount of dilution of the starting material 10 in the solvent(s).

A. Non-emulsification Procedure

In the non-emulsification procedure 16, the organic solution 14 may be gelled immediately 26 or mixed with additives 28 before the gelation step 30. The additives 28 are used to make composite materials that are stronger than the "pure" organic forms, or to enhance desirable physical characteristics. Almost any element or compound may be used as an additive, but specific examples include titanium metal in the form of alkali tetratitanate, aluminum powder, microcrystalline cellulose, sawdust, fibrous or microcrystalline graphite, and fibers of Kevlar ®, cotton, or polyester. Any fibrous material that is not soluble in the original organic solution 14 is a potential additive. In making composite graphite materials, the fibrous graphite must be mixed thoroughly in the solution, otherwise the fibers cluster along the pore or cell walls and do not form a homogeneous composite material.

Although the biofoam can be produced with or without the emulsion process, the emulsion step greatly improves the homogeneity of the cell or pore size throughout the material. When a gel formed without emulsification freezes, the cell size increases from the bottom to the top of the material relative to the freezing surface. This cell size gradient develops as the freeze front slows toward the top, and the solvent crystals (typically ice) grow larger, thus forming larger cells.

B. Emulsification Procedure

In the emulsification procedure 18, the natural organic material 10 is first dissolved in at least one polar solvent 12, preferably water, to form an organic solution 14. At least one nonpolar organic solvent 30 is added to the solution, which then may be emulsified directly 32. Emulsification is the process of dispersing one liquid in a second immiscible liquid by agitation. An emulsion is the heterogeneous mixture of the normally immiscible liquid phases, in which one liquid forms minute droplets suspended in the other liquid. A surface-active agent 34 is usually added to prevent the droplets from coalescing and to stabilize the emulsion.

The preferred nonpolar solvents 30 are p-xylene (1,4-dimethylbenzene) and cyclohexane, but other nonpolar solvents are effective: hexadecane, 2-nitrofuran, lauryl alcohol, acetophenone, and p-methyl acetophenone. Almost any organic solvent that is insoluble in water and has a freezing point between +30° C. and −30° C. can be used. However, a freeze-drying temperature must be chosen that will allow both the polar solvent (e.g. water) and the nonpolar solvent to remain frozen during the freeze-drying process (sublimation). Also, choosing a solvent with a freezing point too far below 0° C. is inadvisable, because the vapor pressure of the ice will be so low that an inordinately long time is required for freeze-drying.

The natural organic material 10, such as agar, is the pore- or cell-forming material in the biofoam. The solvents 12,30 are not dissolved, but are physically present and separate in the emulsion. The nonpolar solvent 30 is immiscible in water and unreactive with the other chemical species in the emulsion. The dilution of the naturally occurring organic material determines the density (and cell wall thickness) of the final foam; that is, higher dilution produces lighter foams. A smaller number of organic molecules dispersed in the solution will produce thinner cell walls and less dense foams. The volume ratios of the organic solution and the nonpolar solvent (typically about 1:0.1-1) can be varied endlessly to produce foams of any desired density. However, producing a stable emulsion often requires some modification of the ratio of water solution to nonpolar organic solvent. This adjustment is especially necessary with high concentrations of solute (organic material).

In the emulsification procedure 18, a surface-active agent 34, or surfactant, is typically added to the organic mixture. The surfactant lowers the surface tension of the liquid droplets, promoting the cellular foam structure, and improves the blending of the solvents. In most cases, a surface-active agent is needed to form a stable emulsion. A small amount of sodium dioctyl sulfosuccinate is effective, and other surfactants will work as well.

The addition of various additives 36 to the organic mixture, such as short fibers, metals, or metal-containing compounds, can greatly improve the strength of the final foam material and enhance other physical or aesthetic qualities. Any metal may be added to the mixture to satisfy a particular application; aluminum powder is one example. Graphite or Kevlar® fibers are not added in the emulsification process because these fibers are much larger than the diameter of the emulsion droplets. Consequently, the fibers are squeezed into the interdroplet spaces and agglomerate into an inhomogeneous mass, thus destroying the microstructure of the material. However, alkali tetratitanate has proven very effective, and microcrystalline cellulose or sawdust can be added to increase the density and strength of the final material. The critical characteristic of any fibrous additive in this procedure is that the length of the fibers be shorter than the diameter of the emulsion droplets.

The resultant organic mixture, which may or may not include a surface-active agent 34 and an additive 36, is emulsified 38 and gelled 40.

C. Gelation

The solution from the non-emulsification process or the emulsion from the emulsification process is cast in a container of any shape or size to gel 30,40. Typically, the solution or emulsion is poured into a rectangular mold with a copper bottom and allowed to gel. The container can be placed in an ice water bath to hasten gelation, although the gel can form at ambient temperatures. Care must be taken not to freeze the gel at the gelation step. The gelation time depends on the amount of dilution of the solution, as well as the temperature. Highly dilute solutions will take more time, but typically gelation will occur in minutes.

D. Gel Treatment

The gel produced with or without emulsification 16,18 is then rapidly frozen 20 in a cold ethanol bath. The copper on the bottom of the casting container has high thermal conductivity, so when the container is placed in the ethanol bath, a freeze front travels quickly from the bottom of the container to the top, freezing the molecules of water and solvent in the cells or pores. The solvents are frozen within the cells of the gel, and then the solid solvents are sublimed during freeze-drying 22. If the solvents were allowed to become liquid, the foam structure would shrink and collapse.

The frozen gel is placed in freeze-drying units, which are kept at around $-6°$ C. The frozen gels are vacuum dried over a few days. The solvent and water sublime, and the gases are collected on cold traps outside the freeze-dry units. The organic solvent should have a freezing point greater than about $-30°$ C., and preferably greater than $-20°$ C., but below $+20°$ C. As a practical consideration, a freezing point lower than $-30°$ C. will extend the amount of freeze-drying time needed to sublime all the solvent and water to many days, which would unnecessarily increase the cost of production.

E. Final Foam

Figure 2:
FIG. 2 is an SEM micrograph of an agar-gelatin biofoam produced by the non-emulsion process.
Figure 3:
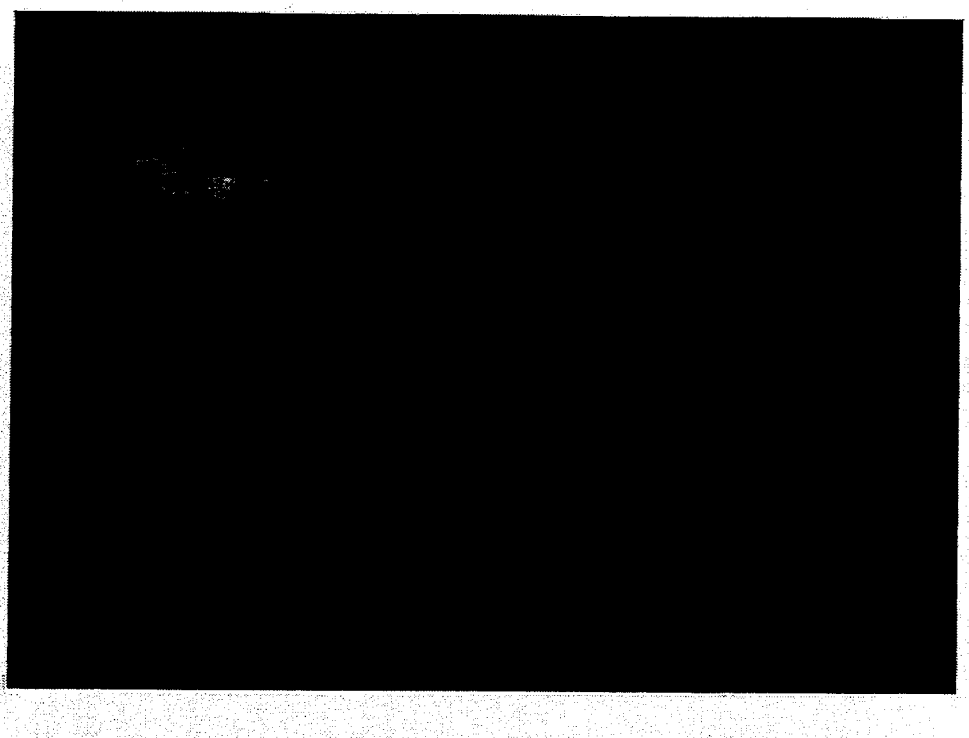
FIG. 3 is a photograph of an agar-gelatin biofoam produced by the emulsion process.

The final organic foam 24 is a highly permeable, open-cell structure, with a density typically ranging from less than air (1.2 $mg/cm^3$) to about 500 $mg/cm^3$, and more commonly to about 300 $mg/cm^3$. The pore or cell sizes usually are in the range of 1-10 $\mu m$ diameter, and more typically are clustered around 1-3 $\mu m$, although the cell size distribution is broad. FIG. 2 is an SEM photograph showing the cellular microstructure of a biofoam having a density of about 50 $mg/cm^3$, and which was made from a 50-50 mixture of agar and gelatin using the non-emulsion process.

The typical surface area of biofoam is about 10 $m^2/g$. The foams are visibly opaque, with low thermal and acoustic conductivity, and have the mechanical strength to support hundreds of times their own weight. The biofoam is biodegradable, soluble in hot water, and non-toxic, depending on the additives used.

EXAMPLE I

Agar Foam With Emulsification

One embodiment of the biofoam is made from agar, a polysaccharide material that is derived from certain red algae, particularly the seaweed Rhodophyceae. Rhodophyceae is a class of red algae (belonging to the subphylum Rhodophyta) with several agar-producing genera, which grow in the Pacific and Indian Oceans and the Japan Sea. Agar is commonly used as a nutrient medium for bacterial cultures, as a laxative, and as a food thickener. The simplest molecular formula for the agar foam is approximately $CH_2O$.

This foam can be made by emulsifying a mixture of agar and gelatin. Two grams (2.0 grams) of agar and two grams (2.0 grams) of gelatin are dissolved in 66.5 milliliters of hot water. This solution is mixed with 0.5 milliliters of the surface-active agent sodium dioctyl sulfosuccinate and 33.0 milliliters of p-xylene. The agar-gelatin mixture is emulsified in a high-speed blender and then poured into a mold to gel. The newly gelled material retains the microscopic foam structure formed during emulsification. The gel is frozen and then freeze-dried as described in Parts C and D, leaving intact the cellular structure of the foam.

By varying the conditions during the emulsification process, the wall thickness of the foam cells can be precisely controlled. When freeze-drying is complete, the cast material is removed from the mold. The final material is machinable. The density of the biofoam made in this example is approximately 50 $mg/cm^3$. FIG.

3 shows an opaque, unmachined agar-gelatin foam produced using this emulsion process.

EXAMPLE II

Foam by Non-Emulsification Process

To form a biofoam using the non-emulsification procedure, equal amounts of agar (2.5 grams) and gelatin (2.5 grams) are dissolved in 100 milliliters of hot water. The solution is allowed to gel, and the gel is frozen and freeze-dried as described in Parts C and D. The final foam has a density of about 62 mg/cm$^3$.

EXAMPLE III

Graphite Composite Foam

Figure 4:
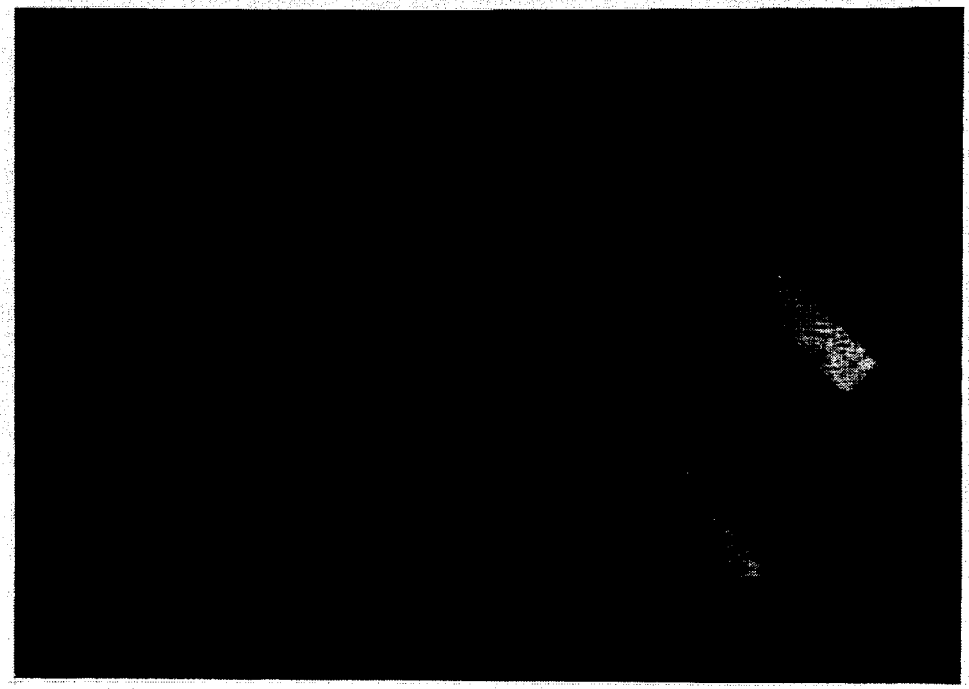
FIG. 4 is a photograph of a composite graphite biofoam.

Composite foam materials are typically made using the nonemulsification procedure. As in Example II, equal amounts of agar (2.5 grams) and gelatin (2.5 grams) are dissolved in 100 milliliters of hot water. The solution is mixed with carbon graphite fibers (1.0 gram) in a blender. The mixture is poured into a mold and allowed to gel, and then frozen and freeze-dried as in Parts C and D. The density of the final foam is about 72 mg/cm$^3$. FIG. 4 shows several machined parts of this graphite composite biofoam.

The foregoing description of preferred embodiments of the invention is presented for purposes of illustration and description and is not intended to be exhaustive or to limit the invention to the precise form disclosed. Many modifications and variations are possible in light of the above teaching.

I claim:

1. A method for forming a rigid, microcellular biofoam, comprising the steps:
    (a) dissolving a naturally occurring organic material in a primary solvent to form a solution;
    (b) forming a gel from the solution;
    (c) freezing the gel; and
    (d) freeze-drying the gel to form an organic biofoam.

2. A method for forming a biofoam as recited in claim 1, wherein the naturally occurring organic material comprises at least one of agars, agarose, algins, alginates, gums, resins, gum resins, and gelatins.

3. A method for forming a biofoam as recited in claim 2, wherein the naturally occurring organic material comprises at least two of agars, agarose, algins, alginates, gums, resins, gum resins, and gelatins.

4. A method for forming a biofoam as recited in claim 1, wherein the primary solvent is selected from the group consisting of ketones, ethers, alcohols, and water.

5. A method for forming a biofoam as recited in claim 1, further comprising the step:
    dissolving an additive in the solution before forming the gel to produce a composite organic biofoam material.

6. A method for forming a biofoam as recited in claim 5, wherein the additive is selected from the group consisting of fibers and metal powders.

7. A method for forming a biofoam as recited in claim 5, wherein the additive is selected from the group consisting of graphite fibers, microcrystalline cellulose, sawdust, microcrystalline graphite, aramid fibers, cotton fibers, polyester fibers, alkali tetratitanate, and aluminum powder.

8. A method for forming a biofoam as recited in claim 1, wherein step (b) comprises the steps:
    (1) adding a nonpolar organic solvent to the solution;
    (2) emulsifying the solution to form an emulsion; and
    (3) forming a gel from the emulsion.

9. A method for forming a biofoam as recited in claim 8, wherein the nonpolar organic solvent has a freezing point between about −20° C. and about +20° C.

10. A method for forming a biofoam as recited in claim 8, wherein the nonpolar organic solvent is selected from the group consisting of 1,4-dimethylbenzene, cyclohexane, hexadecane, 2-nitrofuran, lauryl alcohol, acetophenone, and p-methyl acetophenone.

11. A method for forming a biofoam as recited in claim 8, further comprising the step:
    dissolving an additive in the solution before the emulsification step (2).

12. A method for forming a biofoam as recited in claim 8, further comprising the step:
    dissolving a surface-active agent in the solution before the emulsification step (2).

13. A method for forming a biofoam as recited in claim 8, wherein the organic material comprises at least one of agars, agarose, algins, alginates, gums, resins, gum resins, and gelatins.

14. A method for forming a biofoam as recited in claim 13, wherein the naturally occurring organic material comprises at least two of agars, agarose, algins, alginates, gums, resins, gum resins, and gelatins, and wherein the primary solvent comprises water, and the nonpolar organic solvent is selected from the group consisting of 1,4-dimethylbenzene and cyclohexane.

15. A composition of matter, comprising:
    a rigid, microcellular organic biofoam formed of a naturally occurring organic material comprises at least one of agars, agarose, algins, alginates, gums, resins, gum resins, and gelatins;
    wherein the biofoam has a density less than about 500 mg/cm$_3$ and an average pore diameter greater than one micrometer.

16. A microcellular organic biofoam as recited in claim 15, further comprising an additive selected from the group consisting of graphite fibers, microcrystalline cellulose, sawdust, aramid fibers, cotton fibers, polyester fibers, alkali tetratitanate, metal powders, and microcrystalline graphite.

17. A microcellular organic biofoam as recited in claim 15, wherein the biofoam has a density between about 1 mg/cm$^3$ and about 300 mg/cm$^3$.

18. A microcellular organic biofoam as recited in claim 15, wherein the biofoam has a density between about 1 mg/cm$^3$ and about 100 mg/cm$^3$.

19. A rigid, microcellular biofoam formed by the process comprising the steps:
    (a) dissolving a naturally occurring organic material in a primary solvent to form a solution;
    (b) forming a gel from the solution;
    (c) freezing the gel; and
    (d) freeze-drying the gel to form an organic biofoam.

20. A microcellular biofoam formed by the process as recited in claim 19, wherein step (b) comprises the steps:
    (1) adding a nonpolar organic solvent to the solution;
    (2) emulsifying the solution to form an emulsion; and
    (3) forming a gel from the emulsion.

* * * * *